United States Patent [19]
Mahon et al.

[11] Patent Number: 6,034,197
[45] Date of Patent: Mar. 7, 2000

[54] POLYOL BLEND, MULTI-COMPONENT SYSTEM FOR PRODUCING POLYURETHANE FOAM, AND FOAM PRODUCED THEREBY

[75] Inventors: William J. Mahon, Southbury; Gerald J. Zabawa, New Milford; Michael R. Sandner, Newtown, all of Conn.

[73] Assignee: Sealed Air Corporation, Duncan, S.C.

[21] Appl. No.: 09/123,170

[22] Filed: Jul. 27, 1998

[51] Int. Cl.[7] .................................................. C08G 18/48
[52] U.S. Cl. ...................... 527/174; 521/175; 252/182.25
[58] Field of Search .................................... 521/174, 175; 252/182.25

[56] References Cited

U.S. PATENT DOCUMENTS

| | | | |
|---|---|---|---|
| 4,008,189 | 2/1977 | van Leuwen et al. | 521/174 |
| 4,607,064 | 8/1986 | Kuhn et al. | 521/174 |
| 5,227,408 | 7/1993 | Hanna et al. | 521/130 |
| 5,369,138 | 11/1994 | Gansen | 521/159 |
| 5,484,820 | 1/1996 | Mispreuve et al. | 521/174 |
| 5,538,779 | 7/1996 | Mispreuve et al. | 428/220 |
| 5,686,502 | 11/1997 | Murray et al. | 521/174 |
| 5,690,855 | 11/1997 | Nichols et al. | 252/182.27 |
| 5,698,609 | 12/1997 | Lockwood et al. | 521/173 |

*Primary Examiner*—Rachel Gorr
*Attorney, Agent, or Firm*—Thomas C. Lagaly

[57] ABSTRACT

A polyol blend is disclosed for making polyurethane foams. The blend includes a first polyol having a functionality of about 2, a hydroxyl number ranging from about 20 to about 90, and an equivalent weight ranging from about 600 to about 2800; a second polyol having a functionality ranging from about 4 to about 8, a hydroxyl number ranging from about 200 to about 600, and an equivalent weight ranging from about 90 to about 280; and a third polyol having a functionality ranging from about 2.5 to about 4, a hydroxyl number ranging from about 15 to about 500, and an equivalent weight ranging from about 180 to about 4000. The polyol blend is capable of reacting with an isocyanate compound in the presence of water to produce a foam having a density ranging from about 0.5 to about 5 pounds/ft$^3$, a compressive strength ranging from about 3 to about 20 psi, and an airflow ranging from about 10 to about 1000 cc/minute.

33 Claims, 1 Drawing Sheet

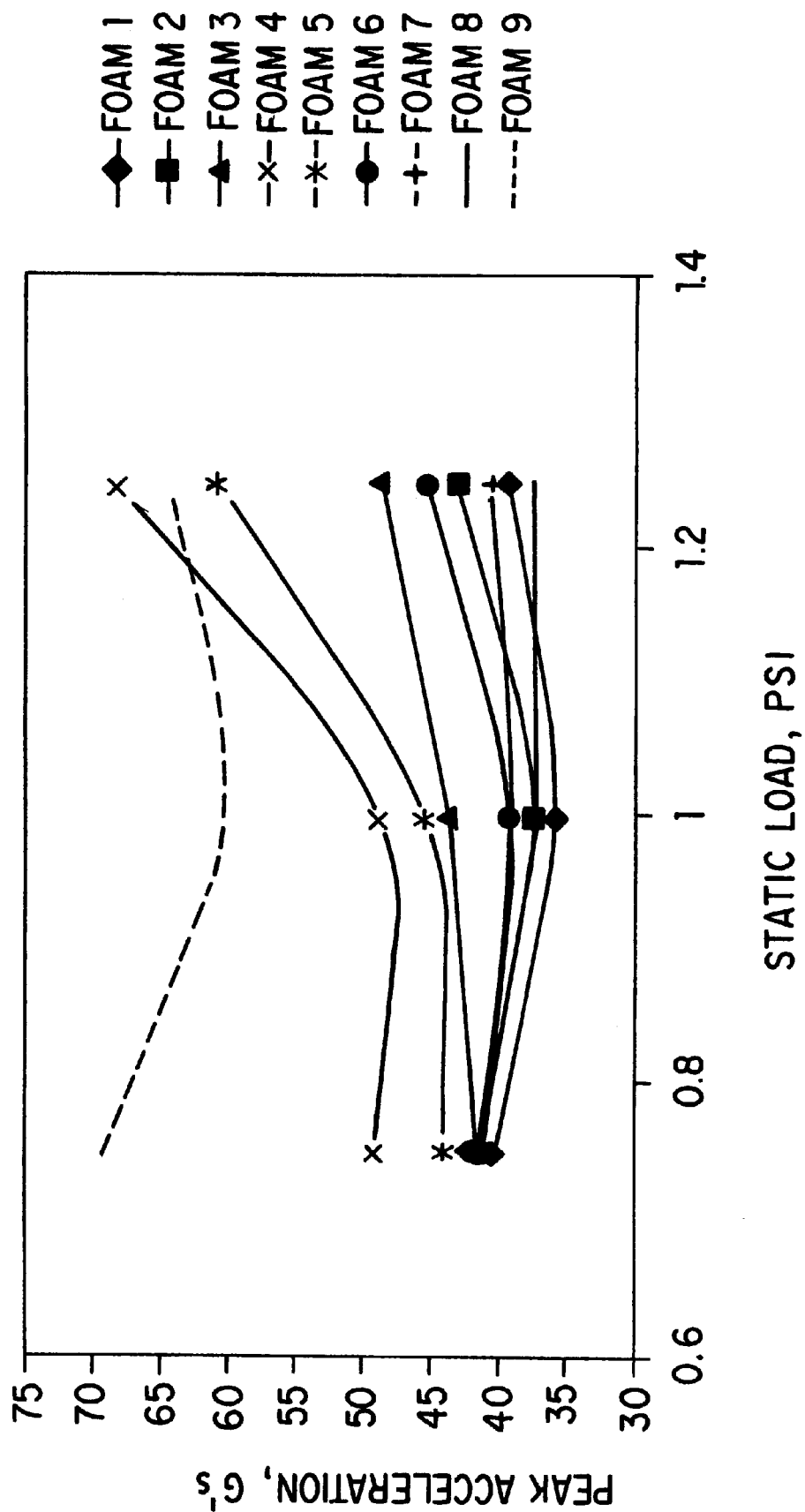

POLYOL BLEND, MULTI-COMPONENT SYSTEM FOR PRODUCING POLYURETHANE FOAM, AND FOAM PRODUCED THEREBY

BACKGROUND OF THE INVENTION

The present invention relates to polyol blends that are capable of reacting with isocyanate compounds to form polyurethane foams having a high degree of compressive strength and shock attenuation over a wide range of static loading such that the foams are useful in a wide variety of packaging applications.

Polyurethane foams are currently used, inter alia, to package articles as a means for protecting such articles as they are being shipped and handled. The foams may be pre-formed into molded shapes that correspond to the shape of the packaged article. Often, two pre-formed foam pieces are used, with one of the pieces being placed under the article while the other piece is placed above the article. The resultant foam-article-foam 'sandwich' is then placed in a shipping carton, whereby the two pieces support and encapsulate the article during shipping and handling.

Alternatively, polyurethane foam may molded "in place," i.e., about the article, essentially using the article as a forming mold. This is generally accomplished by mixing the necessary reactants to make polyurethane foam (generally a polyol, an isocyanate compound, and other materials as discussed below) in a vented bag, placing the bag in the bottom of a shipping carton, placing the article to be packaged atop the bag as the reactants begin to expand into a foam, and then placing a similar bag with an expanding polyurethane foam atop the article. If desired, the foam reactants may simply be mixed in the bottom of the carton, i.e., without a bag, with a sheet of film placed atop the expanding foam and with the article placed atop the sheet. A second sheet of film is then placed over the article and additional foam is formed thereon. In either case, the carton is finally closed to complete the process so that, as with the pre-formed foam package, the two molded-in-place foam pieces support and encapsulate the article for shipping and handling.

Polyurethane foams for both pre-formed and in-place packaging are typically produced by the reaction of an isocyanate compound with a hydroxyl-containing material, such as a polyol (i.e., a compound that contains multiple hydroxyl groups). The most common isocyanates are toluene diisocyanate (TDI) and methylene diphenylisocyanate (MDI), particularly the latter. As with any foaming process, a blowing agent must be used to expand the resultant polymeric structure into a cellular structure. Traditional blowing agents that have been used include fluorocarbons, chlorofluorocarbons, and other halogenated hydrocarbons. However, such blowing agents are not preferred for environmental reasons and cost. Instead, it is preferred to react the isocyanate and polyol in the presence of water. The water reacts with the isocyanate compound to produce carbon dioxide which, in turn, serves as the blowing agent by causing the polyurethane to expand into a foam.

Cellular polyurethane foams are typically classified as being either rigid or flexible. Rigid polyurethane packaging foams are generally closed-cell foams characterized as having a relatively high degree of compressive strength, e.g., typically greater than about 14 psi.

As used herein, the term "compressive strength" refers to a numerical physical property value of a foam that is determined from a point on a stress v.s. deformation (i.e., deflection) curve for that foam at the yield point or at 10% deformation, whichever point occurs first as compressive stress increases, as measured in accordance with ASTM D 1621. Externally applied stress deforms the cell structure of foams. For foams that exhibit a sudden collapse (failure) of the cells at a certain level of applied stress, the value at the maximum deformation point of the curve (i.e., just prior to failure) corresponds to the compressive strength of the foam at the yield point. For foams that do not exhibit a definite failure point, the value at 10% deformation is used to represent the compressive strength of the foam. The compressive strength is expressed in terms of stress/unit area of the foam at which stress is applied.

Rigid polyurethane foams are often employed in packaging applications in which the packaging foam will be subjected to high static loading, e.g., of 1 psi and above, such as is encountered when packaging heavy articles. Examples of such articles include industrial machinery, electric motors, engines, transmissions, synthetic stones, etc. Because of their high compressive strength, rigid polyurethane foams have traditionally been used in such applications due to their ability to support heavy articles both statically and when the foam is subjected to high compressive forces, e.g., when the package is jostled during shipping and handling.

A major drawback of rigid or polyurethane foams, however, is that their ability to absorb and attenuate impact shocks and vibrations is often insufficient to properly protect the packaged article. That is, while rigid polyurethane foams function well in supporting and restricting the movement of packaged articles, such foams often transmit external shocks and vibrations to the packaged article in amounts that exceed the maximum amounts that the packaged article can withstand without suffering damage. The susceptibility of articles to shock or vibration damage, known as the "fragility" of the article, is conventionally expressed in terms of a "G" value. That is, "fragility" refers to the maximum shock that a packaged article can withstand without suffering damage, wherein such maximum shock is measured as the number of Gs, the gravitational constant, transmitted to the article. The more susceptible an article is to damage, the lower the number of Gs that can be transmitted to that article without damaging the article. Thus, "very delicate" articles (such as aircraft altimeters) may have a fragility of about 15 to 40 Gs; "delicate" articles (such as computer disk drives) may have a fragility of about 40 to 80 Gs; "moderately rugged" articles (such as TVs and VCRs) may have a fragility of 80 to 100 Gs; and "rugged" articles (such as furniture) may have a fragility of about greater than 115 Gs. Due to their low attenuation of transmitted shock, rigid polyurethane foams are generally useful for packaging articles having a fragility of 115 Gs and higher.

When packaging more fragile articles having lower G values, i.e., less than about 80 Gs, flexible polyurethane foams are generally employed. This is because, in comparison to more rigid polyurethane foams, flexible polyurethane foams absorb and attenuate external shock and vibration to a higher degree so that a smaller proportion of the shock or vibration is transmitted to the packaged article. In this manner, delicate and very delicate articles are less likely to be damaged when packaged in flexible foams than when packaged in rigid foams.

In general, however, flexible polyurethane foams, which are generally open-cell foams, have a lower compressive strength and less load bearing capability than their more rigid counterparts. This necessitates either packaging only relatively lightweight articles in flexible foam or using a sufficient amount, i.e., thickness, of the flexible foam to compensate for the load bearing and compressive strength qualities of the foam. The former option is undesirable in that many articles requiring relatively high load-bearing and compressive strength capabilities also have low G values, while the latter option is undesirable because it adds extra cost to the package.

Accordingly, a need exists in the art for a polyurethane foam having a relatively high degree of compressive strength and with excellent shock and vibration absorbing characteristics over a broad range of static loading conditions so that a wide variety of articles, including those having fragility values below about 40–45 Gs, can be packaged by the foam with minimal foam thickness being required.

SUMMARY OF THE INVENTION

That need is met by the present invention, which provides a polyol blend comprising:

a) a first polyol comprising one or more polyether polyols having a functionality of about 2, a hydroxyl number ranging from about 20 to about 90, and an equivalent weight ranging from about 600 to about 2800;

b) a second polyol comprising one or more polyether polyols having a functionality ranging from about 4 to about 8, a hydroxyl number ranging from about 200 to about 600, and an equivalent weight ranging from about 90 to about 280; and c) a third polyol comprising one or more polyether polyols having a functionality ranging from about 2.5 to about 4, a hydroxyl number ranging from about 15 to about 500, and an equivalent weight ranging from about 180 to about 4000.

The polyol blend is capable of reacting with an isocyanate compound in the presence of water to produce a foam having a density ranging from about 0.5 to about 5 pounds/ft$^3$, a compressive strength ranging from about 3 to about 20 psi, and an airflow ranging from about 10 to about 1000 cc/minute.

In accordance with another aspect of the present invention, a multi-component system for producing foam is provided, comprising:

a. a first polyol comprising one or more polyether polyols having a functionality of about 2, a hydroxyl number ranging from about 20 to about 90, and an equivalent weight ranging from about 600 to about 2800;

b. a second polyol comprising one or more polyether polyols having a functionality ranging from about 4 to about 8, a hydroxyl number ranging from about 200 to about 600, and an equivalent weight ranging from about 90 to about 280;

c. a third polyol comprising one or more polyether polyols having a functionality ranging from about 2.5 to about 4, a hydroxyl number ranging from about 15 to about 500, and an equivalent weight ranging from about 180 to about 4000; and d. an isocyanate compound, wherein, the first, second, and third polyols are capable of reacting with the isocyanate compound in the presence of water to produce a foam having a density ranging from about 0.5 to about 5 pounds/ft$^3$, a compressive strength ranging from about 3 to about 20 psi, and an airflow ranging from about 10 to about 1000 cc/minute. Preferably, the first, second, and third polyols are provided as a blend as described above.

Yet another aspect of the present invention is directed to a foam, comprising the reaction product of:

a. a polyol blend as described above;

b. an isocyanate compound; and c. water, wherein, the foam has a density ranging from about 0.5 to about 5 pounds/ft$^3$, a compressive strength ranging from about 3 to about 20 psi, and an airflow ranging from about 10 to about 1000 cc/minute.

BRIEF DESCRIPTION OF DRAWING

FIG. 1 displays transmitted shock values versus static load for the examples.

DETAILED DESCRIPTION OF THE INVENTION

The polyol blend in accordance with the present invention includes a mixture of first, second, and third polyols that can be made into a polyurethane foam having good compressive strength and the ability to withstand static loadings that encompass a broad and useful range for a variety of packaging applications while providing a high degree of shock and vibration attenuation such that very delicate articles can be safely packaged within the foam.

The first polyol comprises one or more polyether polyols having a functionality of about 2, a hydroxyl number ranging from about 20 to about 90, and an equivalent weight ranging from about 600 to about 2800. More preferably, the first polyol has a hydroxyl number ranging from about 30 to about 70 and an equivalent weight ranging from about 800 to about 2000. Most preferably, the hydroxyl number ranges from about 30 to about 50 and the equivalent weight ranges from about 1000 to about 1800.

The term "functionality" is used herein to refer to the number of reactive hydroxyl groups, —OH, that are attached to the polyol. The first polyol thus has two pendent hydroxyl groups and may be referred to as a diol. In the production of polyurethane foam, the hydroxyl groups react with isocyanate groups, —NCO, that are attached to the isocyanate compound. The term "hydroxyl number" refers the number of reactive hydroxyl groups available for reaction, and is expressed as the number of milligrams of potassium hydroxide equivalent to the hydroxyl content of one gram of the polyol (ASTM D4274-88). The term "equivalent weight" refers to the weight of the polyol that will combine with an isocyanate group, and may be calculated by dividing the molecular weight of a polyol by its functionality.

The first polyol preferably has an ethylene oxide content of less than about 50% by weight, based on the total weight of the first polyol. More preferably, the ethylene oxide content ranges from about 15 to 45% and, most preferably, from about 20 to 45%.

The first polyol may be formed as the reaction product of one or more alkylene oxides, such as ethylene oxide, propylene oxide, butylene oxide, or mixtures of two or more such oxides, with an active hydrogen-containing initiator having a functionality of about 2. Suitable initiators may include water, ethylene glycol, propylene glycol, and higher molecular weight glycol analogs.

Non-limiting examples of commercially-available diols that may be used as the first polyol in accordance with the present invention include the following: PLURACOL HP1250D, HP2500D, HP3000D, HP4000D, 628, 1062, P1010, P 2010, and 1044, available from BASF Corporation; PLURONIC L44, L61, L62, L63, L64, L65, L72, P84, L92, P94, L101, P103, P104, L121, L122, and P123, also available from BASF Corporation; RUBINOL R301, F456 F459, F460, and F995, available from ICI Polyurethanes; SYNPERONIC PE L44, L43, L42, L31, L62, L64, P84, P94, L61, L81, L101, and L121, also available from ICI Polyurethanes; MULTRANOL 9195, 9111, 9190, 9182, 3600, and 9109, available from Bayer Corporation; and VORANOL EP2001, P2055, P2000, 5012, 5120, 4240, 5124, 5140, 5287, available from Dow Chemical Company.

Either one diol or a blend of two or more diols may be used for the first polyol in accordance with the present invention.

The second polyol of the polyol blend of the invention comprises one or more polyether polyols having a functionality ranging from about 4 to about 8, a hydroxyl number ranging from about 200 to about 600, and an equivalent weight ranging from about 90 to about 280. More preferably, the second polyol has a hydroxyl number ranging from about 300 to about 600 and an equivalent weight ranging from about 95 to about 200. Most preferably, the hydroxyl number ranges from about 400 to about 600 and the equivalent weight ranges from about 100 to about 150.

The second polyol preferably has an ethylene oxide content of less than about 25% by weight, based on the total weight of the second polyol. More preferably, the ethylene oxide content of the second polyol is less than about 20%, even more preferably less than about 15%, more preferably still less than about 10% and, most preferably, less than about 5%.

The second polyol may be the reaction product of one or more alkylene oxides and a compound selected from the group consisting of carbohydrates, a mixture of carbohydrates, and a mixture of one or more carbohydrates and one or more compounds selected from the group consisting of aliphatic diols, triols, water, and mixtures thereof. Alkylene oxides similar to those named with respect to the first polyol may also be used to form the second polyol. A preferred alkylene oxide for the second polyol is propylene oxide.

A variety of carbohydrates having an average functionality of above about 4 are available. The carbohydrates sucrose, sorbitol, and mixtures of sucrose and sorbitol have been determined to be useful in preparing the cellular polyurethane foam product of the invention. Also determined to be useful in the practice of the invention are fructose, glucose, lactose, maltose, galactose, sorbose, xylose, arabinose, mannose, cellobiose, methyl glucoside, and mixtures thereof, including mixtures with sucrose and sorbitol.

Aliphatic diols and triols that can be used in admixture with one or more carbohydrates include ethylene glycol, propylene glycol, 1,3-butylene glycol, 1,4-butylene glycol, 2,3-butylene glycol, glycerol, trimethylolpropane, triethylolpropane, 1,2,6-hexane triol, and mixtures thereof. A mixture of glycerol and a compound selected from the group consisting of sucrose, sorbitol, water, and mixtures thereof has been determined to be useful.

Non-limiting examples of commercially-available polyols useful as second polyols in accordance with the invention include the following: MULTRANOL 9260, 4030, and 4034, available from Bayer Corporation; THANOL R-572, available from Arco Chemical; POLY G 74-532, available from Olin Chemical; VORANOL 280, 370, 202, 490, 520, 615, and 800, available from Dow Chemical Co.; and RUBINOL R180 and R140, available from ICI Polyurethanes.

Either one polyol or a blend of two or more polyols may be used for the second polyol in accordance with the present invention.

The third polyol of the polyol blend in accordance with the invention comprises one or more polyether polyols having a functionality ranging from about 2.5 to about 4, a hydroxyl number ranging from about 15 to about 500, and an equivalent weight ranging from about 180 to about 4000. More preferably, the third polyol has a hydroxyl number ranging from about 20 to about 400 and an equivalent weight ranging from about 200 to about 3000. Most preferably, the hydroxyl number ranges from about 25 to about 300 and the equivalent weight ranges from about 220 to about 2500.

The third polyol has an ethylene oxide content of less than about 25% by weight, based on the weight of the third polyol. More preferably, the ethylene oxide content of the third polyol is less than about 22% and, even more preferably, less than about 19%.

The third polyol may be the reaction product of one or more alkylene oxides and a compound selected from the group consisting of aliphatic triols, tetrols, mixtures thereof, and a mixture of one or more aliphatic triols and/or tetrols and one or more compounds selected from the group consisting of aliphatic diols, water, and mixtures thereof. Alkylene oxides similar to those named with respect to the first and second polyols may also be used to form the third polyol. Useful triols and tetrols for making the third polyol include glycerol, trimethylolpropane, triethylolpropane, 1,2,6-hexane triol, and pentaerythritol.

Examples of commercially-available polyols that may be used for the third polyol in accordance with the invention include the following: ARCOL 11-27, LHT240, and F3020, available from Arco Chemical Co.; VORANOL 203, 410, 415, 270, 274, 4148, 4301, and 4815, available from Dow Chemical Co.; RUBINOL F428 F436, R421, and F455, available from ICI Polyurethanes; MULTRANOL 7100, 7049, 7056, 3900, 3901, 9151, 9225, 9128, 9157, 7057, and 8105, available from Bayer Corporation; and PLURACOL PEP 450, PEP 550, 220, 355, 380, 593, 628, 1062, and 1123, available from BASF Corporation.

Either one polyol or a blend of two or more polyols may be used for the third polyol in accordance with the present invention.

The first polyol is preferably present in the blend at a weight percentage ranging from about 10 to about 80 and the second polyol is preferably present in the blend at a weight percentage ranging from about 20 to about 90, the weight percentages being based on the total amount of the first and second polyols in the blend. More preferably, the weight percentage of the first polyol relative to the second polyol ranges from about 20 to about 75, even more preferably from about 30 to about 70, and most preferably from about 40 to about 65. Correspondingly, the weight percentage of the second polyol relative to the first polyol preferably ranges from about 25 to about 80, more preferably from about 30 to about 70, and most preferably from about 35 to about 60.

Preferably, the total amount of the first and second polyols in the polyol blend collectively ranges from about 10 to about 80 weight percent, such weight percent being based on the total weight of the polyol blend. The balance includes the third polyol, plus any catalysts, additives, etc. as discussed below. More preferably, the total weight percentage of the first and second polyols in the blend ranges from about 20 to about 70, even more preferably from about 30 to about 60, and most preferably from about 35 to about 55.

The third polyol is preferably present in the polyol blend at a weight percent ranging from about 20 to about 70, such weight percent being based on the total weight of the polyol blend. More preferably, the third polyol is present in the blend at a weight percentage ranging from about 25 to about 65, even more preferably from about 30 to about 60, and most preferably from about 35 to about 55.

The inventors have found that the foregoing blend of three polyols is capable of reacting with an isocyanate compound to produce a foam having a number of beneficial properties, as discussed below and shown in the Examples. The first polyol provides flexibility and elasticity to the foam for good shock absorption, while the second polyol provides rigidity for increased compressive strength. The third polyol serves as a compatibilizer between the first and second polyols by making those polyols more soluble in water, and facilitates mixing of the polyol blend with the isocyanate compound to thereby increase the speed at which the foaming reaction occurs. The third polyol also adds elasticity to the foam and provides cross-linking for structural rigidity.

The polyol blend can further comprise, in addition to the first, second, and third polyol components, one or more foam stabilizing agents (i.e., surfactants), one or more catalysts, one or more cell-opening agents, and water in an amount sufficient to provide a blowing agent on reaction of the blend with polyisocyanate to expand the resulting polyurethane to provide a cellular foam product. Water is preferably present in an amount ranging from about 2 to about 8 percent by weight, based on the total weight of the polyol blend. More preferably, the water is present in an amount ranging from about 3 to about 7 wt. % and, even more preferably, from about 4 to about 7 wt. %.

If necessary or desired, surfactants may be employed to assist in stabilizing the foam. Any of the typically available surfactants for the preparation of polyurethane foams may be used, including silicone-based surfactants (e.g., organo-silicone copolymers), organosiloxanes, polyethylene glycol ethers of long chain alcohols, tertiary amine or alkanolamine salts of long chain alkyl acid sulfate esters, alkylsulfonic esters, alkylarysulfonic acids, etc. Surfactants are employed in an amount sufficient to stabilize the foaming reaction mixture against collapse and the formation of large, uneven cells. However, use of too much foam stabilizing agent can lead to loss of dimensional stability and shrinkage of the foam. Preferably, the surfactant (if any) is used in an amount ranging from about 0.05 to about 5 percent by weight of the blend, and more preferably from about 0.1 to about 2.0 wt. %.

One or more catalysts are preferably included in the reaction mixture, either separately from or as part of the polyol blend, to facilitate the reaction of the polyols with the isocyanate compounds, and also other desired reactions, such as the reaction of the isocyanate compound with water to produce carbon dioxide (which, in turn, becomes the blowing agent). Suitable catalysts include amines, preferably tertiary amine compounds such as triethylenediamine, N-methylmorpholine, pentamethyl-diethylenetriamine, dimethylcyclohexylamine, tetramethylethylenediamine, 2-2-(dimethylamino) ethoxy ethanol, 1-methyl-4-dimethylaminoethylpiperazine, 3-methoxy-N-dimethylpropylamine, N-ethylmorpholine, diethylethanolamine, Bis-(2-dimethylaminoethyl) ether, N,N-dimethyl-N',N'-dimethylisopropylpropylenediamine, N-(3-dimethylaminopropyl)-N,N-diisopropanolamine, N,N-diethyl-3-diethylaminopropylamine, dimethylbenzylamine and the like. A catalyst for the trimerization of polyisocyanates, such as an alkali metal alkoxide or carboxylate, may also optionally be employed. Catalysts are preferably present in amounts ranging from about 0.01 to about 3 percent by weight of the polyol blend.

Preferably, the cellular polyurethane foam product of the invention is produced in an at least partially open-cell form by incorporating at least one cell-opening agent in an amount of from about 0.01 to 10% by weight of the blend. Suitable cell opening agents are organic polymers that include liquid, unsaturated, hydrocarbons free of moieties that are reactive with isocyanate groups and wherein these agents have a molecular weight ranging from about 800 to about 10,000. Examples include polybutadiene and poly(1-octene) having a molecular weight of from about 1,000 to 4,000. Polyether polyols with high degrees of ethoxylatoin can also be employed as cell opening agents. Other suitable cell opening agents include commercially available compounds from Goldschmidt Chemical of Hopewell, Va., such as TEGOSTAB B-8919, TEGOSTAB BC-1280, and ORTEGOL 501. Also useful are commercially available silicone surfactants from the Osi division of Witco Chemical Inc., such as L-3001, L-3002, and L-3003.

Other additives that may be included if desired are pigments, colorants, fillers, antioxidants, flame retardants, stabilizers, fragrances, odor masking agents, and the like.

In accordance with another aspect of the present invention, a multi-component system for producing foam includes the first, second, and third polyols as described above, along with an isocyanate compound with which the polyols are capable of reacting to produce a foam. The first, second, and third polyols can be separately contained within the system and then individually combined with the isocyanate compound to carry out the foaming reaction. Preferably, however, the first, second, and third polyols are present in the system as a polyol blend as described above, such that the polyols are introduced to the isocyanate compound simultaneously, i.e., as a blend, to carry out the foaming reaction.

The isocyanate compound with which the polyol blend reacts preferably has an average isocyanate functionality ranging from about 2.0 to about 3.5, and comprises methylene diphenylisocyanate and polymethylene polyphenylisocyanate. More preferably, the average isocyanate functionality ranges from about 2.1 to about 3.2 and, even more preferably, from about 2.2 to about 3.1. "Average isocyanate functionality" refers to the average number of isocyanate (N=C=O) moieties per isocyanate molecule.

The polymethylene polyphenylisocyanate constituent may be present in the isocyanate compound in an amount ranging from about 30 to about 70 weight percent, based on the total weight of the isocyanate compound. The polymethylene polyphenylisocyanate utilized in the isocyanate compound is often referred to as "crude" or "polymeric" MDI. Such compositions are manufactured by the phosgenation of amine mixtures obtained from the condensation of aniline and formaldehyde in appropriate proportions.

The methylene diphenylisocyanate constituent generally is a mixture of 2,4'- and 4,4'-isomers, with the 4,4'-isomer preferably comprising greater than 50 weight percent of such mixture, based on the total weight of the mixture. The total amount of isocyanate compound in the multi-component system should be sufficient to provide an isocyanate reaction index of from about 50 to about 150, preferably from about 65 to about 130, more preferably from about 70 to about 120 and, most preferably from about 80 to about 110. An "isocyanate reaction index" of 100, for example, corresponds to one isocyanate group per isocyanate reactive hydrogen atom present from the water and the polyol blend.

In preparing a foam in accordance with the present invention, it is not necessary to use a halogenated hydrocarbon or other similar volatile hydrocarbon blowing agent. Water present in an amount of from about 2 to about 8 percent by weight based upon the polyol blend will react with the isocyanate groups in the isocyanate compound to generate carbon dioxide. Carbon dioxide then expands to produce the foam. While not wishing to be bound by theory, it is also believed that some of the water is vaporized and by vaporizing thereby also contributes to expansion of the foam.

The process of preparing a polyurethane cellular foam product in accordance with the invention includes the step of reacting the polyol blend of the invention with an isocyanate compound as described above in the presence of water, preferably also in the presence of one or more catalysts and one or more foam stabilizing agents. The isocyanate reactant will typically be used in an amount so as to provide from about 0.8 to 1.5 isocyanate groups per active hydroxyl group.

The polyol blend (or individual polyols), water, one or more catalysts, foam stabilizing agent and the isocyanate compound can all be separately supplied through individual process lines to a single mixing head for reacting. This is sometimes referred to as the "one shot" process. Normally, the catalysts and water are combined into a single process stream for ease of supplying catalysts to the reaction mixture.

A particularly useful method for producing polyurethane foam is to use a "two component" system wherein a polyol blend containing the first, second, and third polyols, one or more suitable catalysts, water, surfactants, and any other additives, such as cell opening agents, pigments, colorants, fillers, antioxidants, flame retardants, stabilizers, and the like, are supplied through a single process line to a mixing head where the blend is mixed by impingement with an isocyanate compound that has been separately supplied to the mixing head. A pre-determined quantity of the mixture can then be directed into a mold to make a pre-formed foam shape for packaging as described above, or into a vented bag or directly into the bottom of a shipping carton for foam-in-place packaging as also described above. The foaming reaction preferably occurs very rapidly after mixing so that the foam begins to form shortly after the reaction mixture has been introduced into the mold, bag, or carton.

A polyurethane foam in accordance with the present invention, which is the reaction product of the above-described polyol blend (or individual polyols) and isocyanate compound in the presence of water, has a density ranging from about 0.5 to about 5 pounds/ft$^3$, a compressive strength ranging from about 3 to about 20 psi, and an airflow ranging from about 10 to about 1000 cc/minute. For pre-formed or foam-in-place packaging applications, the density of the foam preferably ranges from about 1 to about 3 pounds/ft$^3$ and, more preferably, from about 1 to about 2.5 pounds/ft$^3$; the compressive strength preferably ranges from about 5 to about 15 psi and, more preferably, from about 7 to about 12 psi; and the airflow preferably ranges from about 50 to about 800 and, more preferably, from about 100 to about 600 cc/min.

"Density" is measured in accordance with ASTM D3574, Test A 10.1, while compressive strength is measured in accordance with ASTM D1621 as noted hereinabove.

"Airflow" refers to the volume of air that passes through a 0.25 inch thick foam sample in a given period of time in a direction that is parallel to the direction of foam rise, as measured with a densometer having an inner cylinder of 10 ounce weight and 3 inch diameter that forces air through a 1.0 in$^2$ orifice, into an enclosed chamber wherein the foam sample is contained, and out of the bottom of the chamber through a 0.1 in$^2$ orifice, in accordance with TAPPI Standard T 460 om-96 (as modified herein). A preferred densometer is a GURLEY Densometer available from Gurley Precision Instruments, Troy, N.Y., such as a Model 4110 GURLEY Densometer. A densometer measures the time required for a given volume of air to flow through a standard area of material (foam) being tested, under uniform air-pressure. The air-pressure is supplied by an inner cylinder of specific diameter and standardized weight, which may float freely within an outer cylinder partly filled with oil to act as an air-seal. The sample material is held between clamping plates having a circular orifice of a specific area. The inner cylinder is graduated and forces a known volume of air through the foam sample by sliding vertically within the outer cylinder. The airflow through a foam sample is thus determined by measuring the time required for the inner cylinder to drop through a pre-determined number of graduations corresponding to a known volume of air.

The airflow values exhibited by the foams in accordance with the present invention are lower than many traditional polyurethane foams of comparable density, and this is believed to contribute to the low level of transmitted shock (i.e., generally lower than about 45 Gs as shown in the Examples below) through such foams, thereby allowing articles having a lower fragility threshold (i.e., lower G tolerances) to be packaged within such foams without damage.

As can be appreciated by a review of the foregoing description, the inventors have found that a polyurethane foam formed by the polyol blend in accordance with the invention is ideally suited for packaging applications, particularly pre-formed and foam-in-place packaging applications as described above. The foam's compressive strength range of 3 to 20 psi is useful for packaging a wide variety of commonly packaged articles ranging, e.g., from condensing units for air conditioning systems to disk drives and aircraft altimeters. Moreover, within that compressive strength range, the foam provides excellent attenuation of transmitted shock to protect fragile articles. This is demonstrated in the Examples that follow, which show that transmitted G forces over a static loading range of about 0.8 to about 1.2 psi are generally less than about 45.

The invention may be further understood by reference to the following examples, which are provided for illustrative purposes only and are not intended in any way to be limiting.

EXAMPLES

The following tables illustrate particular embodiments of the invention for polyol blends, comprising a first polyol ("Polyol 1"), a second polyol ("Polyol 2") and a third polyol ("Polyol 3"), that were reacted with an isocyanate compound to form Foams 1–8 in accordance with the present invention. The polyol blend further included water, catalysts, Additive 1 and Additive 2. The numbers shown in Table 1 for the polyol blend components are the weight percentages of each component in the polyol blend, based on the total weight of the polyol blend.

"Polyol 1" is a diol having a functionality of 2, an average hydroxyl number of about 39, and an average equivalent weight of about 1450. "Polyol 2" has an average functionality of 4.5, an average hydroxyl number of about 490, and an average equivalent weight of about 114. "Polyol 3" is a blend of three polyols and has an average functionality of about 3, a weighted average hydroxyl number ranging from 97 to 110, and a weighted average equivalent weight ranging from 1097 to 2009.

A Comparative Foam 9 was also made with a polyol blend that included 29.1 wt. % of a polyol having a functionality of about 8, an average hydroxyl number of 541, and an average equivalent weight of 104; and 65 wt. % of a blend of two polyols having an average functionality of 3.2, a weighted average hydroxyl number ranging from 253 to 279, and a weighted average equivalent weight of 326 to 352. The balance of the polyol blend for Comp. Foam 9 included water, catalysts, and Additives 1 and 2 as shown in Table 1.

"Catalysts" are a mixture of triethylenediamine, N-(3-dimethylaminopropyl)-N,N-diisopropanolamine, and a dialkylanolamine.

"Additive 1" is an organo-silicone copolymer while "Additive 2" is believed to be a blend of polybutadiene and poly(1-octene).

Foams 1–6 and 8, the isocyanate compound reacted with the polyol blend at an isocyanate index of 100 and was a polymeric MDI with a functionality of 2.4. For Foam 7, the isocyanate compound reacted with the polyol blend at an isocyanate index of 90 and was a polymeric MDI with a functionality of 2.4. For Comparative Foam 9, the isocyanate compound reacted with the polyol blend at an isocyanate index of 113 and was a polymeric MDI with a functionality of 2.7.

Foams 1–9 were made by mixing, via impingement at 120–160° F., an isocyanate compound with a second component comprising a blend of Polyols 1–3, water, catalyst, and Additives 1–2, and pouring the reacting mixture into a rectangular carton and allowing the resultant foam to rise, cure, and then condition for a minimum of 24 hours before testing.

The foams were then tested for the physical properties shown in Table 1 as follows:
Density ASTM D3574, Test A 10.1
Open Cell % ASTM D6226-98
Airflow Gurley Model 4110 Densometer having 10 ounce, 3 inch diameter inner cylinder that forces air through a 0.1 $in^2$ orifice into an enclosed chamber wherein 0.25 inch thick foam sample is contained
Compressive Strength ASTM D1621

TABLE 1

|  | Foam 1 | Foam 2 | Foam 3 | Foam 4 | Foam 5 | Foam 6 | Foam 7 | Foam 8 | Comparative Foam 9 |
|---|---|---|---|---|---|---|---|---|---|
| Polyol 1 | 25.0 | 12.6 | 40.0 | 2.3 | 11.3 | 22.5 | 22.5 | 33.8 | — |
| Polyol 2 | 20.0 | 10.1 | 30.0 | 42.8 | 33.8 | 22.5 | 22.5 | 11.3 | — |
| Polyol 3 | 47.7 | 70.0 | 22.7 | 47.7 | 47.7 | 47.7 | 47.7 | 47.7 | — |
| Water | 4.8 | 4.8 | 4.8 | 4.8 | 4.8 | 4.8 | 4.8 | 4.8 | 3.4 |
| Catalysts | 1.7 | 1.7 | 1.7 | 1.7 | 1.7 | 1.7 | 1.7 | 1.7 | 1.3 |
| Additive 1 | 0.5 | 0.5 | 0.5 | 0.5 | 0.5 | 0.5 | 0.5 | 0.5 | 1.0 |
| Additive 2 | 0.3 | 0.3 | 0.3 | 0.3 | 0.3 | 0.3 | 0.3 | 0.3 | 0.3 |
| Isocyanate Index | 100 | 100 | 100 | 100 | 100 | 100 | 90 | 100 | 113 |
| Density, pcf. | 1.41 | 1.62 | 1.42 | 1.44 | 1.37 | 1.53 | 1.50 | 1.48 | 1.45 |
| Open Cell % | 93.4 | 96.7 | 96.0 | 95.2 | 92.1 | 90.9 | 91.6 | 92.0 | 97.0 |
| Air Flow, cc/min. | 167 | 511 | 300 | 491 | 388 | 278 | 247 | 154 | 781 |
| Compressive Strength, Parallel to Rise Direction 10% deflection, psi | 6.8 | 5.0 | 7.8 | 10.0 | 8.5 | 8.3 | 6.8 | 5.6 | 13.0 |
| Yield, psi | 6.7 | 5.1 | 7.7 | 9.9 | 8.3 | 8.2 | 6.8 | 5.6 | 12.3 |

Foams with higher compressive strengths may be prepared as set forth above, but with increased percentages of Polyol 2, e.g., greater than 43 wt. %.

Foams 1–9 were tested in accordance with ASTM 4168 to determine their ability to attenuate transmitted shock at static loadings ranging from 0.75 to 1.25 psi. For these tests, the foam samples were 2 inches in thickness and the drop height was 30 inches. A total of five drops were made for each foam sample at each of the reported static loadings. Table 2 sets forth the average transmitted G force (at peak acceleration) v.s. static loading for drops 2–5 (i.e., excluding the results from the first drop and reporting the average of the second through the fifth drop, which is more representative of actual packaging conditions in which the packaged article is subjected to repeated shocks such that the ability of the foam to repeatedly attenuate shock is an important quality).

TABLE 2

Transmitted Shock, 30" Drop Height, 2"Cushion, Average of Drops 2 through 5
ASTM 4168

| Static Loading, psi | Foam 1 | Foam 2 | Foam 3 | Foam 4 | Foam 5 | Foam 6 | Foam 7 | Foam 8 | Comparative Foam 9 |
|---|---|---|---|---|---|---|---|---|---|
| 0.75 | 40.3 | 42.3 | 41.8 | 49.0 | 44.0 | 41.0 | 41.3 | 41.8 | 69.5 |
| 1 | 36.0 | 37.5 | 43.8 | 48.8 | 45.5 | 39.3 | 39.0 | 37.5 | 60.5 |
| 1.25 | 39.5 | 43.3 | 48.0 | 68.3 | 61.0 | 45.5 | 40.8 | 37.8 | 64.5 |

The data in Table 2 is illustrated graphically in FIG. 1. As shown, Foams 1–8 in accordance with the invention transmit less shock to a packaged article than Comparative Foam 9. Foams 1–2 and 6–8 had a minimum compressive strength of 5 psi and transmitted about 45 Gs or less throughout the entire range of tested static loads at a foam thickness of only 2 inches. This allows a wide variety of articles to be packaged, even those that are both heavy and delicate (or very delicate when the static loading is around 1 psi) with minimal foam thickness being required for sufficient shock attenuation. Foams 3 and 5, which transmitted less than 45 Gs at static loads below about 1 psi, have compressive strengths of about 8 psi, and are therefore useful for packaging heavy and delicate articles that can be supported in such away as to provide static loadings between about 0.75 and 1 psi. Similarly, Foam 4 transmitted less than 50 Gs below 1 psi static loading. On the other hand, Comparative Foam 9 transmitted greater than 60 Gs throughout the entire range of tested static loadings. This foam is representative of more rigid polyurethane foams having a relatively higher compressive strength but poor shock attenuation.

What is claimed is:

1. A polyol blend comprising:
   a) a first polyol comprising one or more polyether polyols having a functionality of about 2, a hydroxyl number ranging from about 20 to about 90, and an equivalent weight ranging from about 600 to about 2800;
   b) a second polyol comprising one or more polyether polyols having a functionality ranging from about 4 to about 8, a hydroxyl number ranging from about 200 to about 600, and an equivalent weight ranging from about 90 to about 280; and
   c) a third polyol comprising one or more polyether polyols having a functionality ranging from about 2.5 to about 4, a hydroxyl number ranging from about 15 to about 500, and an equivalent weight ranging from about 180 to about 4000,
wherein, said polyol blend is capable of reacting with an isocyanate compound in the presence of water to produce a foam having a density ranging from about 0.5 to about 5 pounds/ft$^3$, a compressive strength ranging from about 3 to about 20 psi, and an airflow ranging from about 10 to about 1000 cc/minute.

2. The blend of claim 1, wherein said first polyol has a hydroxyl number ranging from about 30 to about 70 and an equivalent weight ranging from about 800 to about 2000.

3. The blend of claim 1, wherein said second polyol has a hydroxyl number ranging from about 300 to about 600 and an equivalent weight ranging from about 95 to about 200.

4. The blend of claim 1, wherein said third polyol has a hydroxyl number ranging from about 20 to about 400 and an equivalent weight ranging from about 200 to about 3000.

5. The blend of claim 1, wherein said first polyol is present in said blend at a weight percentage ranging from about 10 to about 80 and said second polyol is present in said blend at a weight percentage ranging from about 20 to about 90, said weight percentages being based on the total amount of said first and second polyols in said blend.

6. The blend of claim 1, wherein said isocyanate compound with which said polyol blend is capable of reacting has an average isocyanate functionality ranging from about 2.0 to about 3.5 comprises methylene diphenylisocyanate and polymethylene polyphenylisocyanate.

7. The blend of claim 1, wherein said first polyol has an ethylene oxide content of less than about 50% by weight, based on the total weight of said first polyol.

8. The blend of claim 1, wherein said second and third polyols each have an ethylene oxide content of less than about 25% by weight, based on the weight of each of said second and third polyols, respectively.

9. The blend of claim 1, wherein the foam produced from the reaction of said polyol blend with an isocyanate compound has a density ranging from about 1 to about 3 pounds/ft$^3$, a compressive strength ranging from about 5 to about 15 psi, and an airflow ranging from about 50 to about 800 cc/minute.

10. A foam comprising the reaction product of the polyol blend of claim 1 with an isocyanate compound.

11. A package within which a product is enclosed, said package comprising the foam of claim 9.

12. A multi-component system for producing foam, comprising:
   a. a first polyol comprising one or more polyether polyols having a functionality of about 2, a hydroxyl number ranging from about 20 to about 90, and an equivalent weight ranging from about 600 to about 2800;
   b. a second polyol comprising one or more polyether polyols having a functionality ranging from about 4 to about 8, a hydroxyl number ranging from about 200 to about 600, and an equivalent weight ranging from about 90 to about 280;
   c. a third polyol comprising one or more polyether polyols having a functionality ranging from about 2.5 to about 4, a hydroxyl number ranging from about 15 to about 500, and an equivalent weight ranging from about 180 to about 4000; and
   d. an isocyanate compound,
wherein, said first, second, and third polyols are capable of reacting with said isocyanate compound in the presence of water to produce a foam having a density ranging from about 0.5 to about 5 pounds/ft$^3$, a compressive strength ranging from about 3 to about 20 psi, and an airflow ranging from about 10 to about 1000 cc/minute.

13. The system of claim 12, wherein said first polyol has a hydroxyl number ranging from about 30 to about 70 and an equivalent weight ranging from about 800 to about 2000.

14. The system of claim 12, wherein said second polyol has a hydroxyl number ranging from about 300 to about 600 and an equivalent weight ranging from about 95 to about 200.

15. The system of claim 12, wherein said third polyol has a hydroxyl number ranging from about 20 to about 400 and an equivalent weight ranging from about 200 to about 3000.

16. The system of claim 12, wherein said first, second, and third polyols are present in said system as a blend of said polyols.

17. The system of claim 16, wherein said first polyol is present in said blend at a weight percentage ranging from about 10 to about 80 and said second polyol is present in said blend at a weight percentage ranging from about 20 to about 90, said weight percentages being based on the total amount of said first and second polyols in said blend.

18. The system of claim 12, wherein said isocyanate compound has an average isocyanate functionality ranging from about 2.0 to about 3.5 comprises methylene diphenylisocyanate and polymethylene polyphenylisocyanate.

19. The system of claim 12, wherein said first polyol has an ethylene oxide content of less than about 50% by weight, based on the total weight of said first polyol.

20. The system of claim 12, wherein said second and third polyols each have an ethylene oxide content of less than about 25% by weight, based on the weight of each of said second and third polyols, respectively.

21. The system of claim 12, wherein the foam produced from the reaction of said polyols with said isocyanate compound has a density ranging from about 1 to about 3 pounds/ft$^3$, a compressive strength ranging from about 5 to about 15 psi, and an airflow ranging from about 50 to about 800 cc/minute.

22. A foam comprising the reaction product of the polyols and isocyanate compound of claim 12.

23. A package within which a product is enclosed, said package comprising the foam of claim 22.

24. A foam, comprising the reaction product of:
   a. a polyol blend, comprising:
      1) a first polyol comprising one or more polyether polyols having a functionality of about 2, a hydroxyl number ranging from about 20 to about 90, and an equivalent weight ranging from about 600 to about 2800,
      2) a second polyol comprising one or more polyether polyols having a functionality ranging from about 4 to about 8, a hydroxyl number ranging from about 200 to about 600, and an equivalent weight ranging from about 90 to about 280, and
      3) a third polyol comprising one or more polyether polyols having a functionality ranging from about 2.5 to about 4, a hydroxyl number ranging from about 15 to about 500, and an equivalent weight ranging from about 180 to about 4000;
   b. an isocyanate compound; and
   c. water,
wherein, said foam has a density ranging from about 0.5 to about 5 pounds/ft$^3$, a compressive strength ranging from about 3 to about 20 psi, and an airflow ranging from about 10 to about 1000 cc/minute.

25. The foam of claim 24, wherein said first polyol has a hydroxyl number ranging from about 30 to about 70 and an equivalent weight ranging from about 800 to about 2000.

26. The foam of claim 24, wherein said second polyol has a hydroxyl number ranging from about 300 to about 600 and an equivalent weight ranging from about 95 to about 200.

27. The foam of claim 24, wherein said third polyol has a hydroxyl number ranging from about 20 to about 400 and an equivalent weight ranging from about 200 to about 3000.

28. The foam of claim 24, wherein said first polyol is present in said blend at a weight percentage ranging from about 10 to about 80 and said second polyol is present in said blend at a weight percentage ranging from about 20 to about 90, said weight percentages being based on the total amount of said first and second polyols in said blend.

29. The foam of claim 24, wherein said isocyanate compound has an average isocyanate functionality ranging from about 2.0 to about 3.5 comprises methylene diphenylisocyanate and polymethylene polyphenylisocyanate.

30. The foam of claim 24, wherein said first polyol has an ethylene oxide content of less than about 50% by weight, based on the total weight of said first polyol.

31. The foam of claim 24, wherein said second and third polyols each have an ethylene oxide content of less than about 25% by weight, based on the weight of each of said second and third polyols, respectively.

32. The foam of claim 24, wherein the foam produced from the reaction of said polyol blend with said isocyanate compound has a density ranging from about 1 to about 3 pounds/ft$^3$, a compressive strength ranging from about 5 to about 15 psi, and an airflow ranging from about 50 to about 800 cc/minute.

33. A package within which a product is enclosed, said package comprising the foam of claim 24.

* * * * *